US008755790B1

(12) United States Patent
Shen

(10) Patent No.: US 8,755,790 B1
(45) Date of Patent: Jun. 17, 2014

(54) HANDSET-BASED APPROACH OF MULTIMEDIA SERVICE QUALITY MANAGEMENT

(75) Inventor: Jun Shen, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1833 days.

(21) Appl. No.: 11/668,091

(22) Filed: Jan. 29, 2007

(51) Int. Cl.
*H04B 17/00* (2006.01)
*H04W 24/00* (2009.01)

(52) U.S. Cl.
USPC ........................................ 455/423; 455/67.14

(58) Field of Classification Search
USPC ..................... 455/67.11–67.14, 115.2, 226.1, 455/423–425
See application file for complete search history.

(56) References Cited

U.S. PATENT DOCUMENTS

| 6,819,924 | B1 * | 11/2004 | Ma et al. | 455/425 |
| 6,944,448 | B1 * | 9/2005 | Bobst | 455/424 |
| 2004/0186679 | A1 * | 9/2004 | Ohtani | 702/122 |
| 2006/0199548 | A1 * | 9/2006 | Saraby | 455/67.13 |
| 2006/0239369 | A1 * | 10/2006 | Lee | 375/260 |
| 2007/0263668 | A1 * | 11/2007 | Lau et al. | 370/503 |

FOREIGN PATENT DOCUMENTS

WO   WO 2008048155 A1 * 4/2008

OTHER PUBLICATIONS

S. Wolf & M. H. Pinson, "Spatial-temporal distortion metrics for in-service quality monitoring of any digital video system," Proc. SPIE, vol. 3845, pp. 266-277, 1999.*

* cited by examiner

*Primary Examiner* — Ariel Balaoing
*Assistant Examiner* — Larry Sternbane
(74) *Attorney, Agent, or Firm* — Hartman & Citrin LLC

(57) ABSTRACT

Service quality relating to multimedia content is measured in a mobile wireless telecommunication network by comparing, in a mobile wireless device, a received test media clip with a pre-stored sample media clip. The network transmits a test media clip, which is received by one or more mobile wireless devices. A device that receives the test media clip compares it with a sample media clip stored in mobile wireless device memory to detect differences between characteristics of the received test media clip and sample media clip. The device produces a result in response to detected differences. The result is provided to the network's service quality management function.

15 Claims, 2 Drawing Sheets

HANDSET-BASED APPROACH OF MULTIMEDIA SERVICE QUALITY MANAGEMENT

BACKGROUND OF THE INVENTION

1. Field of the Invention

The present invention relates generally to wireless mobile telecommunication networks and, more specifically, to measuring service quality in wireless mobile telecommunication networks that deliver multimedia content to wireless mobile handsets.

2. Description of the Related Art

Service quality management in a wireless mobile telecommunication network refers to assessing how well the network elements are functioning, how well suited the network technology is for handling the intended traffic, and how good a customer perceives his or her user experience to be and further refers to taking any appropriate action in response. Whether the elements of the network are functioning properly and are capable of handling the intended traffic can be measured by hardware probes that monitor network traffic at various nodes and provide estimates of transaction times, delays and throughput. Network coverage can be measured by "drive tests," in which measurements are taken with a mobile receiver at various geographic locations. Nevertheless, the quality of the end-to-end user experience is what determines whether a customer stays with a service provider or leaves it. As technology for delivering multimedia, i.e., video and audio, content to wireless mobile devices is developed, a corresponding need arises for improved methods for measuring service quality, especially as it relates to the user experience.

Technology growth in this area is exemplified by the Multimedia Broadcast-Multicast Service (MBMS), developed by the Third Generation Partnership Program (3GPP) for distributing on-demand multimedia content to many wireless mobile devices in a coverage area. It is contemplated that wireless mobile device users will be able to view television shows, movies, music videos, live sports events, and other television-like content. MBMS is capable of being deployed on conventional Universal Mobile Telecommunications System (UMTS) network infrastructure. MBMS broadcasts content through a Broadcast-Multicast Service Center (BMSC) in a manner analogous to that in which cable TV delivers various programs through cable TV provider's system. The BMSC interfaces with content providers from which the network service provider receives the multimedia content. It also interfaces with a Gateway GPRS Serving Node (GGSN) to deliver the data through the cellular network.

It would be desirable to provide a system and method for measuring multimedia service quality in a wireless mobile network that provides a useful indication of the user experience in MBMS and other multimedia content distribution systems. It is to such a method and system that the present invention is primarily directed.

SUMMARY OF THE INVENTION

The present invention relates to a system and method for measuring service quality in a mobile wireless telecommunication network that is representative of the quality of the user experience of receiving multimedia content through a multimedia service offered by the network service provider. In an exemplary embodiment of the invention, the network transmits a test media clip, which is received by one or more mobile wireless devices. The test media clip comprises content representative of the content that users normally would request through the multimedia service. For example, the content type can be video, and the content can be a portion of a television show or movie. A mobile wireless device that receives the test media clip compares it with a sample media clip stored in mobile wireless device memory to detect differences between characteristics of the received test media clip and sample media clip. The sample media clip consists of the same content as the test media clip. In other words, the sample media clip and the test media clip are copies of one another. For example, the test media clip and sample media clip can both be the same segment of a movie. Therefore, the only differences detectable between characteristics of the received test media clip and stored sample media clip are those due to undesired effects in the transmission path between the network element that serves as the source of the test media clip and the mobile wireless device. The source of the test media clip can be, for example, a Broadcast-Multicast Service Center (BMSC) in a network that conforms to the Multimedia Broadcast-Multicast Service (MBMS).

As characteristics of the received media clip that bear upon service quality can include, for example, the completeness of the set of data packets that the received clip comprises, the time at which a packet arrives, and the consistency of the time intervals at which successive packets arrive, differences between characteristics of the received test media clip and sample media clip can respectively include, for example, packet loss, packet delay and packet jitter. (In the exemplary embodiment, the sample clip can be characterized as a stream of a predetermined number of packets, each separated from the next by a fixed, predetermined time interval.) Other characteristics relating to the reception of a media clip will occur readily to persons skilled in the art to which the invention relates in view of the teachings herein. The device notes each difference (e.g., by counting them) that is detected between what was received and what the sample clip indicates was expected to be received. Although the term "packet" is used herein for convenience, the term is intended to encompass any such transmitted data unit.

The mobile wireless device produces a result in response to detected differences between characteristics of the received test media clip and characteristics of the sample media clip. The result can be, for example, one or more scores that indicate the extent of packet loss, packet delay, jitter or other characteristics relating to the reception of the test media clip in relation to the sample media clip. For example, the score can comprise the percentage of packets that were lost in transmission (i.e., unable to be received), the percentage of packets that were delayed by more than some predetermined threshold, and the percentage of packets that were subject to jitter exceeding some predetermined threshold. The result is provided to the network's service quality management function, i.e., an information aggregator, so that service or engineering personnel or others can diagnose network bottlenecks or other problems and make any adjustments to the network that they believe may improve its performance.

It should also be noted that although in the exemplary embodiment of the invention, described in further detail below, the illustrated network is of the UMTS type and includes MBMS technology, the invention can be embodied in any other suitable wireless mobile telecommunication network technology.

DETAILED DESCRIPTION

Figure 1:
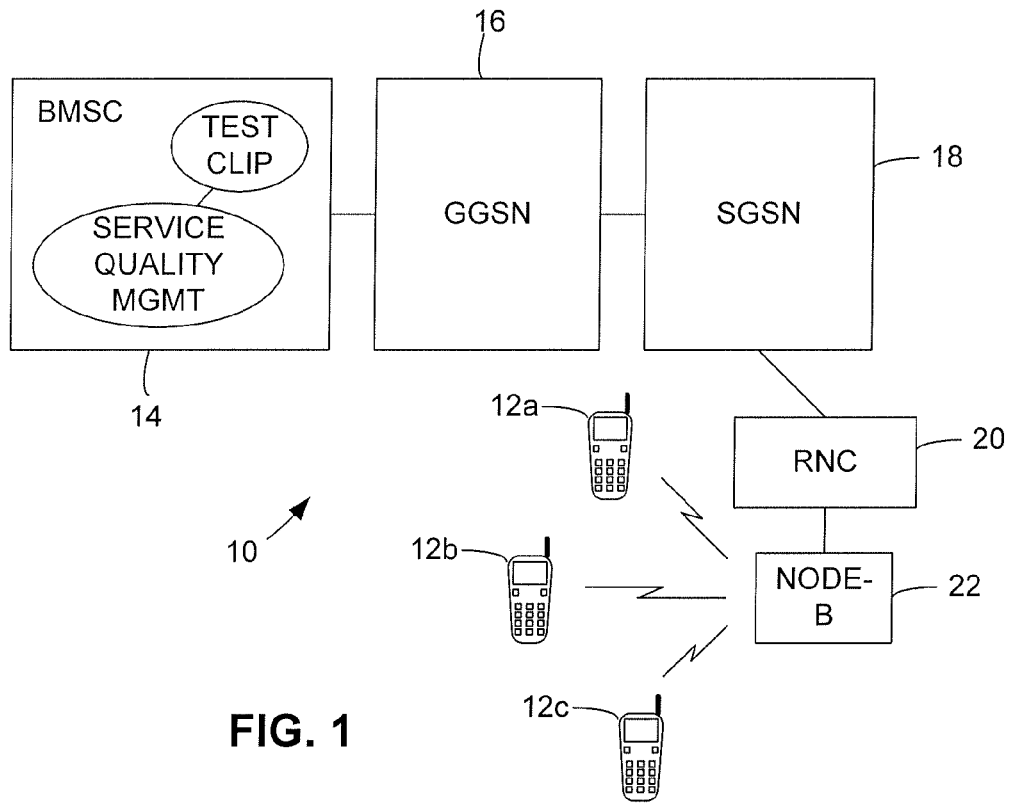
FIG. 1 is a block diagram of a wireless mobile telecommunications system in accordance with an exemplary embodiment of the present invention.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention. Unless specifically noted otherwise, the order in which method steps are described is for illustrative purposes only, and such steps can be arranged in any other suitable order or combined with each other or divided apart in any suitable manner.

As illustrated in FIG. 1, a wireless telecommunication network 10 can communicate with a plurality of test handsets 12 (three of which are shown individually for purposes of illustration as handsets 12a, 12b, 12c, etc.). As described below, test handsets 12 participate in a service quality management method that measures from a user perspective how well media clips are received. The term "media clip," as used herein, refers to digitally encoded content that, when played through a suitable decoder or player in handset 12, allows the user to perceive moving images (e.g., video, animation, graphics, etc.), sounds, or a combination thereof. A media clip, as played through handset 12, can be of any suitable duration. The test media clip and sample media clip described below are types of media clips.

Network 10 can be of any suitable type that allows test handsets 12 to receive media clips or multimedia content from network 10. For example, network 10 can be of a type that conforms to the Universal Mobile Telecommunication System (UMTS) standard. Accordingly, network 10 includes a Broadcast-Multicast Service Center (BMSC) 14, a Gateway General Packet Radio Service (GPRS) Support Node (GGSN) 16, at least one Serving GPRS Support Node (SGSN) 18, and at least one Radio Network Controller (RNC) 20 and Node-B 22. RNC 20 and Node-B 22 define the air interface through which signals are wirelessly transmitted (i.e., via radio) between network 10 and test handsets 12. Network 10 is shown in generalized form for purposes of clarity and can further include any other elements of the types commonly included in such networks. Similarly, although only one RNC 20 and Node-B 22 are shown for purposes of clarity, persons skilled in the art to which the invention relates understand that such a wireless telecommunication network commonly includes many such RNC's and Node-B's. As noted above, although the exemplary network 10 is of the UMTS type and includes MBMS technology, the invention can be embodied in any other suitable wireless mobile telecommunication network technology.

Also, although only the novel test handsets 12 of the present invention are shown, it should be understood that network 10 also communicates in the conventional manner with conventional handsets (not shown for purposes of clarity) or other mobile wireless user equipment of the types that are conventionally used in such networks to make and receive telephone calls, send and receive messages, receive and play multimedia clips, and perform other such conventional actions. As described below, handsets 12 are used to assess how well users of such other, conventional handsets can receive similar multimedia content. Although handset 12 can comprise any suitable mobile wireless device, the term "handset" is used herein for convenience because in the illustrated embodiment of the invention test handset 12 resembles the other conventional handsets or cellular telephones that are used with network 10. Test handset 12 can participate not only in the novel service quality measurement method of the present invention but also in conventional operations, e.g., making and receiving phone calls, etc.

Figure 2:
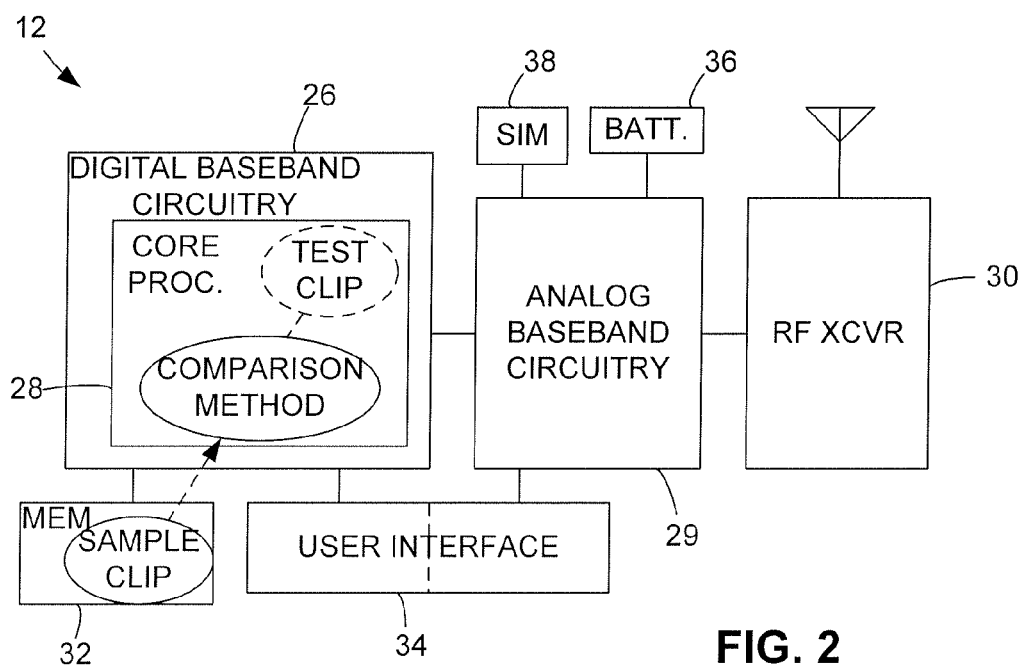
FIG. 2 is a block diagram of a mobile station in accordance with the exemplary embodiment.

As illustrated in FIG. 2, in the exemplary embodiment handset 12 includes digital baseband circuitry 26 having core processing logic 28 that is programmed or configured to effect the exemplary method described below in addition to conventional methods relating to the making and receiving of calls and other conventional operations of the types commonly performed in handsets. In addition to digital baseband circuitry 26 that performs essentially all of the digital operations needed to operate handset 12, handset 12 includes analog baseband circuitry 29 that performs essentially all of the analog operations, and radio frequency (RF) transceiver circuitry 30 that defines the mobile station side of the air interface. Digital baseband circuitry 26 is coupled to memory 32 and digital portions of the user interface 34, such as the display screen, keypad, and other such digital user interface elements commonly included in conventional cellular telephone handsets. Analog baseband circuitry 29 is coupled to the battery 36, SIM card 38, and analog portions of user interface 34, such as the microphone, speaker, vibrator (buzzer), LED indicator lamp, and other such analog user interface elements. Handset 12 can include additional elements of the types commonly included in conventional cellular telephone handsets and other types of user equipment, but such elements are not shown for purposes of clarity. Note that the above-described architecture of handset 12 is intended only to be exemplary, and persons skilled in the art will readily be capable of embodying the invention in systems and methods relating to any other suitable type of mobile station.

In the exemplary embodiment, the aspect of handset 12 that relates most directly to the present invention is the programmed or configured core processing logic 28. Processing logic 28 can comprise, for example, a programmed processor or controller or other hardware, software, firmware or combination thereof. In addition to processing logic 28, digital baseband circuitry 26 includes internal memory (not separately shown), digital signal processing circuitry (not separately shown) that performs GSM encoding and decoding and other functions, and other elements of the types commonly included in the digital portions of a mobile station. In addition to effecting the methods of the present invention, handset 12 operates to make and receive calls in the conventional manner.

Figure 3:
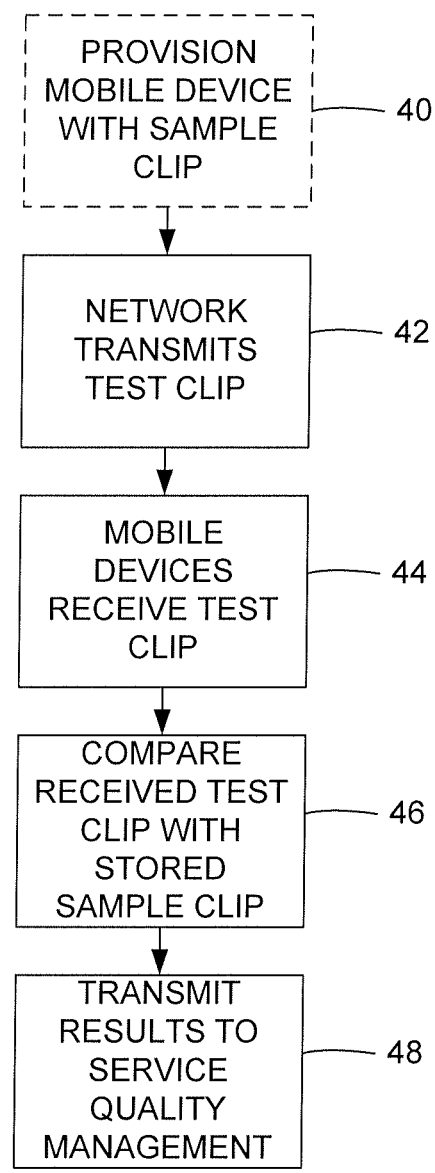
FIG. 3 is a flow diagram illustrating an exemplary method for measuring service quality in the system of FIG. 1.

The flow diagram of FIG. 3. illustrates the exemplary method. Processing logic 28, described above, is programmed or configured with logic (labeled for purposes of clarity as "Comparison Method" in FIG. 2) that effects portions of the method illustrated in FIG. 3. Similarly, BMSC 14 (FIG. 1) or other suitable network element is programmed or configured with service quality management logic that effects other portions of the method.

Step 40 represents the preliminary step (thus indicated in dashed line) at which a sample media clip is stored in memory 32 of mobile wireless device 12. This step can be performed at any suitable time, such as at the time mobile wireless device 12 is provisioned by the service provider to enable its use by a subscriber. This step can be performed in any suitable manner that ensures the sample media clip is stored without errors, so that it is essentially an exact copy of the test media clip stored in or otherwise accessible to BMSC 14 (FIG. 1). Accordingly, the sample media clip and test media clip consist of the same number of packets, encoded in the same manner (e.g., at the same bit rate).

At any suitable time following preliminary step 40, a number of mobile wireless devices 12 that have been deployed in the field, i.e., dispersed throughout an area of network coverage, can participate in measuring multimedia network service in that area. At step 42, BMSC 14 initiates transmission of the test media clip. As network 10 conforms to the Multimedia Broadcast-Multicast Service (MBMS) in the exemplary embodiment of the invention, the test media clip can be multicast to a number of mobile wireless devices 12. As indicated by step 44, some or all of those mobile wireless devices 12 (e.g., devices 12a-12c) receive the test media clip that was transmitted. As the method can be entirely transparent to the user of device 12, the clip need not be played back through the display screen, speaker, etc., of device 12. The user can ignore what is occurring in device 12, as the method does not require interaction with the user. Indeed, device 12 can be left unattended by a user.

As indicated by step 46, each mobile wireless device 12 that received the test clip compares what it received (indicated in FIG. 2 in dashed line as "Test Clip") with the sample clip stored in memory 32. The comparing step detects any differences between characteristics of the clip as received from network 10 and corresponding characteristics of the clip as played back from memory 32. The characteristics can be any that bear upon how good the user's experience would have been had the received clip been played for the user. Characteristics can include completeness of the set of data packets that the received clip comprises, the time at which packets arrive, and the consistency of the time intervals at which successive packets arrive, as missing packet or delayed packets and jitter in the packet intervals can be manifested in video content as poor picture quality or a shaky, blurred or incomplete image. The comparison method notes any differences between the measured (i.e., actual) and expected values of the characteristics (as represented by the sample clip). The results of the comparison can be expressed in terms of the percentage of packets lost, percentage of packets that were delayed by more than a predetermined threshold, or in any other suitable manner.

As indicated by step 48, device 12 transmits the results of the comparison to the service quality management function of network 10, which in the exemplary embodiment is part of BMSC 14. The transmission can be a text message (e.g., in accordance with the Short Messaging System (SMS) standard). The service quality management function acts as an information aggregator that gathers the results reported by the various devices 12 that received the test clip and reported results back to BMSC 14. The information collected by the service quality management function can be used by engineering or service personnel or others to improve network performance or aid further testing. For example, personnel can cause the method to be repeated with devices 12 being in different locations than previously. In that manner, personnel can determine whether the results are independent of geographic network coverage issues or whether network coverage needs improvement. Also, personnel can cause the method to be repeated with different test clips and sample clips (also pre-stored in devices 12) from those used previously. The various test clips can differ in aspects that bear upon how well the network can handle them, such as differing degrees of motion of features in a video image. Generally speaking, due to the manner in which video compression algorithms work, a video image in which features move very little or very slowly places lower demands upon a network than a video image in which features move more rapidly. The present invention enables personnel to assess whether portions of the network need improvement before users will have a satisfactory experience viewing video clips with intense motion.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method comprising:
    receiving, at a mobile wireless device comprising a processor and a memory via a mobile wireless telecommunications network, a first test media clip;
    comparing, by the mobile wireless device, the first test media clip with a first sample media clip stored in the memory of the mobile wireless device to detect differences between characteristics of the first test media clip and characteristics of the first sample media clip, the first sample media clip representing the same content as the first test media clip, wherein comparing the first test media clip with the first sample media clip occurs without the mobile wireless device playing back the first test media clip;
    producing, by the mobile wireless device, a result in response to the differences detected between the characteristics of the first test media clip and the characteristics of the first sample media clip;
    transmitting, by the mobile wireless device via a text message, the result to a service quality management information aggregator, the result comprising the differences detected between the characteristics of the first test media clip and the characteristics of the first sample media clip; and
    repeating, by the mobile wireless device, the receiving, comparing, producing, and transmitting using a second test media clip and a second sample media clip, wherein the second test media clip and the second sample media clip comprise a degree of motion of features in a video image of the second test media clip and the second sample media clip different than a degree of motion of features in a video image of the first test media clip and the first sample media clip.

2. The method of claim 1, wherein the first sample media clip is stored in the memory of the mobile wireless device when the mobile wireless device is provisioned by a service provider.

3. The method of claim 1, wherein the first test media clip is received at the mobile wireless device from a broadcast-multicast service center of the mobile wireless telecommunications network.

4. The method of claim 1, wherein the differences detected between the characteristics of the first test media clip and the characteristics of the first sample media clip comprise packet loss.

5. The method of claim 1, wherein the differences detected between the characteristics of the first test media clip and the characteristics of the first sample media clip comprise packet jitter.

6. The method of claim 1, wherein the differences detected between the characteristics of the first test media clip and the characteristics of the first sample media clip comprise packet delay.

7. A method comprising:
storing, at a broadcast-multicast service center of a mobile wireless telecommunications network, a first test media clip comprising a first video image having a first degree of motion of features;
transmitting, by the broadcast-multicast service center via the mobile wireless telecommunications network, the first test media clip to a mobile wireless device;
receiving, by the broadcast-multicast service center via a text message from the mobile wireless device, a first result of a comparison between the first test media clip and a first sample media clip stored in a memory of the mobile wireless device, wherein the first test media clip and the first sample media clip represent a same content, wherein the first result comprises differences detected, by the mobile wireless device, between characteristics of the first test media clip and characteristics of the first sample media clip, and wherein the differences are caused by transmitting the first test media clip from the broadcast-multicast service center to the mobile wireless device via the mobile wireless telecommunications network; and
utilizing, by the broadcast-multicast service center, the first result to improve performance of the mobile wireless telecommunications network and aid further testing of the mobile wireless telecommunications network.

8. The method of claim 7, further comprising:
storing, at the broadcast-multicast service center of the mobile wireless telecommunications network, a second test media clip comprising a second video image having a second degree of motion of features, wherein the second degree of motion of features of the second video image of the second test media clip is different from the first degree of motion of features of the first video image of the first test media clip;
transmitting, by the broadcast-multicast service center via the mobile wireless telecommunications network, the second test media clip to the mobile wireless device;
receiving, by the broadcast-multicast service center via a further text message from the mobile wireless device, a second result of a comparison between the second test media clip and a second sample media clip stored in the memory of the mobile wireless device, wherein the second test media clip and the second sample media clip represent a same content, wherein the second result comprises differences detected, by the mobile wireless device, between characteristics of the second test media clip and characteristics of the second sample media clip, and wherein the differences are caused by transmitting the second test media clip from the broadcast-multicast service center to the mobile wireless device via the mobile wireless telecommunications network; and
utilizing, by the broadcast-multicast service center, the second result to improve the performance of the mobile wireless telecommunications network and aid the further testing of the mobile wireless telecommunications network.

9. The method of claim 7, wherein the differences detected between the characteristics of the first test media clip and the characteristics of the first sample media clip comprise packet loss.

10. The method of claim 7, wherein the differences detected between the characteristics of the first test media clip and the characteristics of the first sample media clip comprise packet jitter.

11. The method of claim 7, wherein the differences between the characteristics of the first test media clip and the characteristics of the first sample media clip comprise packet delay.

12. A mobile wireless device comprising:
a processor; and
a memory storing instructions that, when executed by the processor, cause the processor to perform operations comprising:
receiving a first test media clip,
comparing the first test media clip with a first sample media clip stored in the memory to detect differences between characteristics of the first test media clip and characteristics of the first sample media clip, wherein comparing the first test media clip with the first sample media clip occurs without the mobile wireless device playing back the first test media clip,
producing a result in response to the differences detected between the characteristics of the first test media clip and the characteristics of the first sample media clip,
transmitting the result to a service quality management information aggregator, wherein the result comprises the differences detected between the characteristics of the first test media clip and the characteristics of the first sample media clip.

13. The mobile wireless device of claim 12, wherein the differences detected between the characteristics of the first test media clip and the characteristics of the first sample media clip comprise packet loss.

14. The mobile wireless device of claim 12, wherein the differences detected between the characteristics of the first test media clip and the characteristics of the first sample media clip comprise packet jitter.

15. The mobile wireless device of claim 12, wherein the differences detected between the characteristics of the first test media clip and the characteristics of the first sample media clip comprise packet delay.

* * * * *